US011778461B2

(12) United States Patent
Nakamura

(10) Patent No.: US 11,778,461 B2
(45) Date of Patent: Oct. 3, 2023

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Takashi Nakamura, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 422 days.

(21) Appl. No.: 16/821,009

(22) Filed: Mar. 17, 2020

(65) Prior Publication Data
US 2021/0029541 A1 Jan. 28, 2021

(30) Foreign Application Priority Data
Jul. 26, 2019 (JP) ................................. 2019-137612

(51) Int. Cl.
*H04W 12/06* (2021.01)
*H04W 12/08* (2021.01)
*H04N 1/44* (2006.01)

(52) U.S. Cl.
CPC .......... *H04W 12/06* (2013.01); *H04W 12/08* (2013.01); *H04N 1/4433* (2013.01)

(58) Field of Classification Search
CPC ....... H04W 12/06; H04W 12/08; H04W 4/80; H04N 1/4433; H04N 1/4413;
(Continued)

(56) References Cited

U.S. PATENT DOCUMENTS

| 7,716,708 B2* | 5/2010 | Nishimura | ............ H04L 65/612 725/93 |
| 2011/0188079 A1* | 8/2011 | Suzuki | ...................... G06F 3/12 358/1.15 |

(Continued)

FOREIGN PATENT DOCUMENTS

| JP | 2004-320617 A | 11/2004 |
| JP | 2013-065252 A | 4/2013 |

(Continued)

OTHER PUBLICATIONS

Radio Communication System, JP_H114478_A_H, Kubooka et al. Jan. 1999 (Year: 1999).*

(Continued)

Primary Examiner — Meng Li
Assistant Examiner — Lydia L Noel
(74) Attorney, Agent, or Firm — Oliff PLC

(57) ABSTRACT

An information processing apparatus includes an authenticating unit, a transmitter, a receiver, and a controller. The authenticating unit authenticates a user. The transmitter transmits user identification information of the user authenticated by the authenticating unit to a management apparatus via a dedicated network used for exchanging the user identification information and restriction information. The receiver receives the restriction information of the user corresponding to the transmitted user identification information from the management apparatus via the dedicated network. The controller controls a range of a function usable by the user based on the restriction information received by the receiver.

18 Claims, 11 Drawing Sheets

(58) Field of Classification Search
CPC . H04N 1/00315; H04L 63/101; H04L 63/083; H04L 63/0876
See application file for complete search history.

(56) References Cited

U.S. PATENT DOCUMENTS

| | | | |
|---|---|---|---|
| 2014/0176987 A1* | 6/2014 | Sakagami | G06F 3/1238 358/1.14 |
| 2015/0193182 A1* | 7/2015 | Nishio | G06F 21/552 358/1.14 |
| 2017/0272896 A1* | 9/2017 | Suzuki | H04B 5/0031 |
| 2018/0268157 A1* | 9/2018 | Kamiya | G06F 21/6209 |
| 2021/0076319 A1* | 3/2021 | Yoshikawa | H04L 45/24 |

FOREIGN PATENT DOCUMENTS

| | | |
|---|---|---|
| JP | 2016-074135 A | 5/2016 |
| JP | 2019-116791 A | 7/2019 |

OTHER PUBLICATIONS

Feb. 7, 2023 Office Action issued in Japanese Patent Application No. 2019-137612.

* cited by examiner

FIG. 6

| USER ID: 10001 | LOCAL | MONOCHROME COPYING, SCANNING |
| --- | --- | --- |
| | IF1 | AUTHENTICATION INFORMATION ONLY |
| | IF2 | AUTHENTICATION INFORMATION ONLY |
| | IF3 | MONOCHROME PRINTING, PULL SCANNING |
| | IF4 | NONE |
| USER ID: 10002 | LOCAL | COLOR COPYING, SCANNING, OCR |
| | IF1 | AUTHENTICATION INFORMATION ONLY |
| | IF2 | AUTHENTICATION INFORMATION ONLY |
| | IF3 | COLOR PRINTING, PULL SCANNING |
| | IF4 | SMPT, WebDAV |

FIG. 9

| NETWORK ID: 9C:AE:D3:D7:AE:36 | | |
|---|---|---|
| USER ID: 10001 | LOCAL | MONOCHROME COPYING, SCANNING |
| | IF1 | AUTHENTICATION INFORMATION ONLY |
| | IF2 | AUTHENTICATION INFORMATION ONLY |
| | IF3 | MONOCHROME PRINTING, PULL SCANNING |
| | IF4 | NONE |
| USER ID: 10002 | LOCAL | COLOR COPYING, SCANNING, OCR |
| | IF1 | AUTHENTICATION INFORMATION ONLY |
| | IF2 | AUTHENTICATION INFORMATION ONLY |
| | IF3 | COLOR PRINTING, PULL SCANNING |
| | IF4 | SMPT, WebDAV |

| NETWORK ID: AC:36:43:CA:AE:25 | | |
|---|---|---|
| USER ID: 10001 | LOCAL | COLOR COPYING, SCANNING |
| | IF1 | AUTHENTICATION INFORMATION ONLY |
| | IF2 | AUTHENTICATION INFORMATION ONLY |
| | IF3 | COLOR PRINTING, PULL SCANNING |
| | IF4 | SMPT |
| USER ID: 10002 | LOCAL | COLOR COPYING, SCANNING, OCR |
| | IF1 | AUTHENTICATION INFORMATION ONLY |
| | IF2 | AUTHENTICATION INFORMATION ONLY |
| | IF3 | MONOCHROME PRINTING, PULL SCANNING |
| | IF4 | NONE |

FIG. 10

| USER ID: 10001 | APPARATUS ID: 99901 | MONOCHROME COPYING, SCANNING |
|---|---|---|
| | LOCAL | |
| | IF1 | AUTHENTICATION INFORMATION ONLY |
| | IF2 | AUTHENTICATION INFORMATION ONLY |
| | IF3 | MONOCHROME PRINTING, PULL SCANNING |
| | IF4 | NONE |
| USER ID: 10002 | LOCAL | COLOR COPYING, SCANNING, OCR |
| | IF1 | AUTHENTICATION INFORMATION ONLY |
| | IF2 | AUTHENTICATION INFORMATION ONLY |
| | IF3 | COLOR PRINTING, PULL SCANNING |
| | IF4 | SMPT, WebDAV |

| USER ID: 10001 | APPARATUS ID: 99902 | COLOR COPYING, SCANNING |
|---|---|---|
| | LOCAL | |
| | IF1 | AUTHENTICATION INFORMATION ONLY |
| | IF2 | AUTHENTICATION INFORMATION ONLY |
| | IF3 | COLOR PRINTING, PULL SCANNING |
| | IF4 | SMPT |
| USER ID: 10002 | LOCAL | COLOR COPYING, SCANNING, OCR |
| | IF1 | AUTHENTICATION INFORMATION ONLY |
| | IF2 | AUTHENTICATION INFORMATION ONLY |
| | IF3 | MONOCHROME PRINTING, PULL SCANNING |
| | IF4 | NONE |

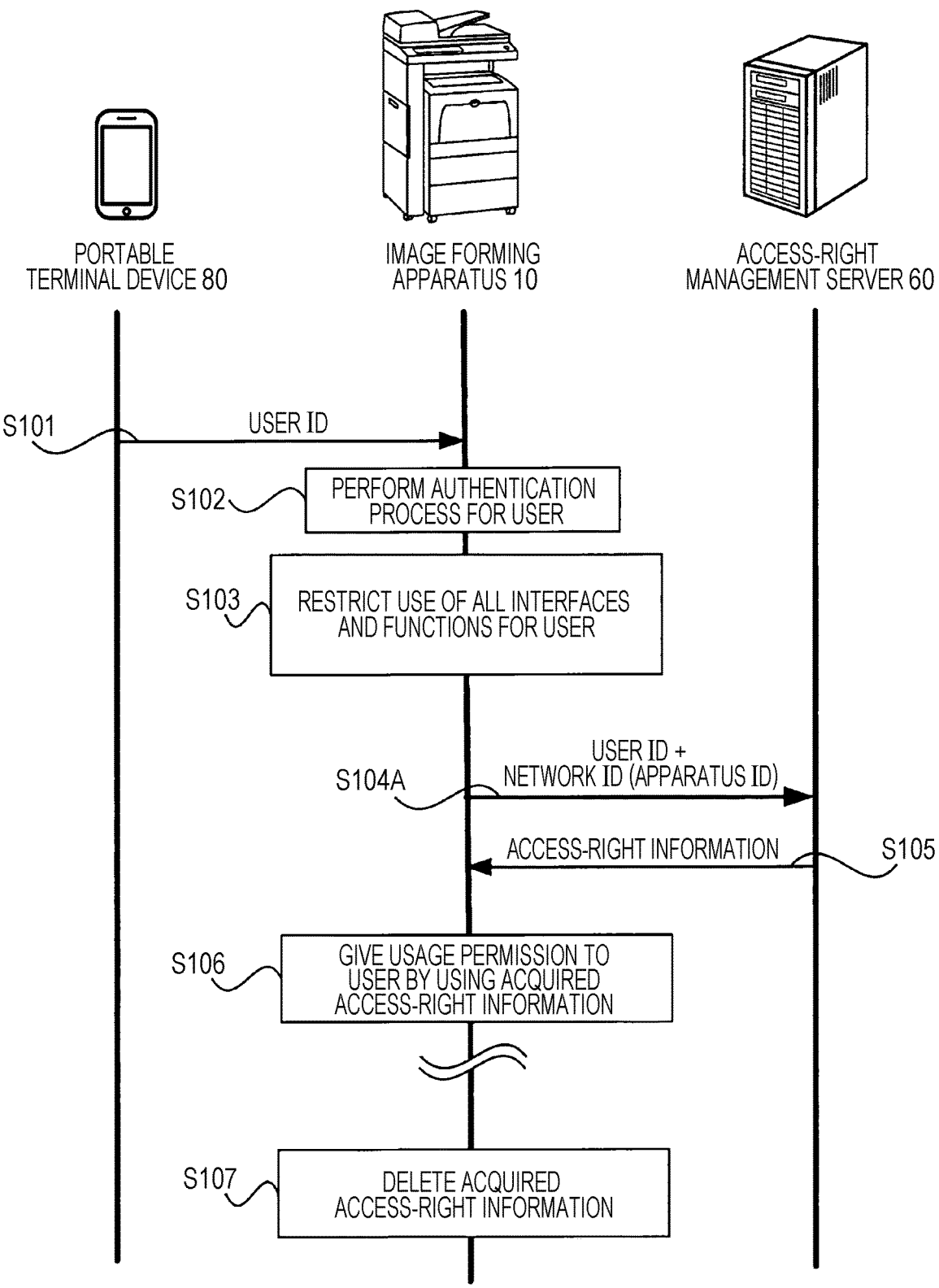

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-137612 filed Jul. 26, 2019.

BACKGROUND

(i) Technical Field

The present disclosure relates to information processing apparatuses, information processing systems, and non-transitory computer readable media.

(ii) Related Art

Japanese Unexamined Patent Application Publication No. 2004-320617 discloses an information management system that determines whether to permit or prohibit dynamic informational access from a portable terminal based on access position information in addition to authentication based on a terminal owner's ID and a password.

SUMMARY

Aspects of non-limiting embodiments of the present disclosure relate to an information processing apparatus, an information processing system, and a non-transitory computer readable medium that are capable of acquiring restriction information corresponding to user identification information of a user without having to transmit the user identification information via a network used by unspecified users.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an authenticating unit, a transmitter, a receiver, and a controller. The authenticating unit authenticates a user. The transmitter transmits user identification information of the user authenticated by the authenticating unit to a management apparatus via a dedicated network used for exchanging the user identification information and restriction information. The receiver receives the restriction information of the user corresponding to the transmitted user identification information from the management apparatus via the dedicated network. The controller controls a range of a function usable by the user based on the restriction information received by the receiver.

BRIEF DESCRIPTION OF THE DRAWINGS

An exemplary embodiment of the present disclosure will be described in detail based on the following figures, wherein:

FIG. 6 illustrates an example of an access-right management table stored in an access-right-information storage unit;

FIG. 9 illustrates another example of the access-right management table stored in the access-right-information storage unit;

FIG. 10 illustrates another example of the access-right management table stored in the access-right-information storage unit; and FIG. 11 is a sequence chart illustrating how data is exchanged among the portable terminal device, the image forming apparatus, and the access-right management server when access-right information varies for each network ID or each apparatus ID.

DETAILED DESCRIPTION

Next, an exemplary embodiment of the present disclosure will be described in detail with reference to the drawings.

Figure 1:
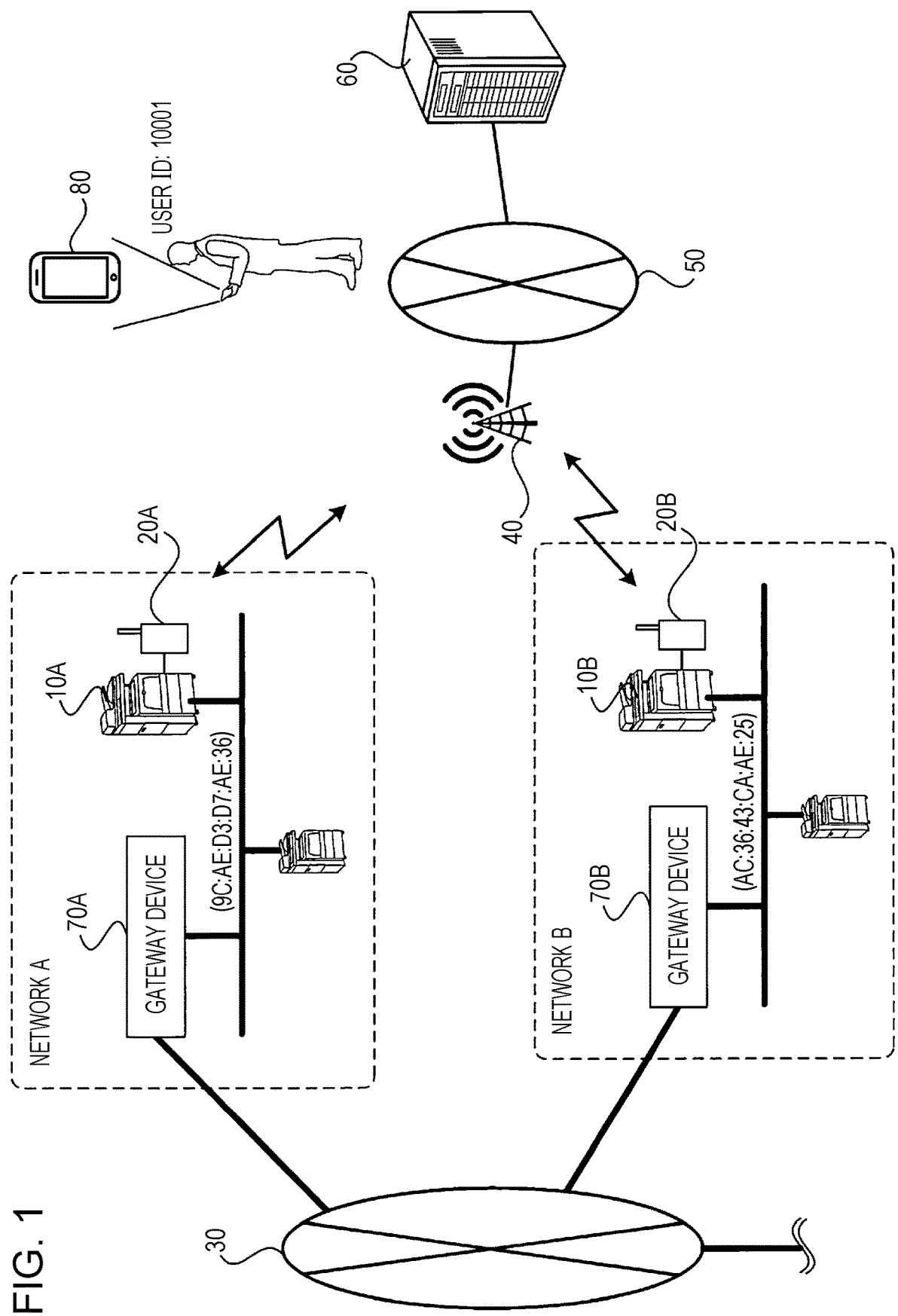
FIG. 1 illustrates a system configuration of an information processing system according to an exemplary embodiment of the present disclosure.

FIG. 1 illustrates a system configuration of an information processing system according to an exemplary embodiment of the present disclosure.

In the information processing system according to this exemplary embodiment, image forming apparatuses 10A and 10B, low-power wide-area (LPWA) communication modules 20A and 20B respectively connected to the image forming apparatuses 10A and 10B, and an access-right management server 60 that stores management information used for managing setting information of multiple image forming apparatuses including the image forming apparatuses 10A and 10B are connected via a base station 40 and an LPWA communication network 50.

In the information processing system according to this exemplary embodiment, corporate networks A and B that vary among different locations for a certain corporation are established. The corporate networks A and B are connected to the Internet 30 by gateway devices 70A and 70B, respectively.

Although only two image forming apparatuses 10A and 10B are shown in this exemplary embodiment for simplifying the description, the same configuration is applicable in a case where there are three or more image forming apparatuses. Furthermore, since the two image forming apparatuses 10A and 10B have the same configuration, they will be referred to as image forming apparatuses 10 when collectively describing the configuration of the two image forming apparatuses 10A and 10B.

In the information processing system according to this exemplary embodiment, when a user belonging to a certain corporation desires to use the image forming apparatus 10A or 10B, the user is not allowed to use the image forming apparatus 10A or 10B until the user performs user authentication. Furthermore, in the information processing system according to this exemplary embodiment, an access right for controlling the permission of use of which function of the image forming apparatus 10A or 10B or the permission of exchanging of what type of information via which interface is set for each user.

This access right is managed in the access-right management server 60. Specifically, the access-right management server 60 is a management apparatus that stores a user ID as user identification information of each user in correspondence with access-right information as restriction information for restricting the range of functions usable by the user.

The following description relates to a case where a user with a user identifier (referred to as "user ID" hereinafter) 10001 uses the image forming apparatus 10A in the information processing system according to this exemplary embodiment.

In this exemplary embodiment, the user ID is stored in a portable terminal device 80 held by the user. By bringing this portable terminal device 80 close to a predetermined location of the image forming apparatus 10A or 10B, the user ID is read via near-field wireless communication, such as Bluetooth (registered trademark) Low Energy (BLE) or near-field communication (NFC), so that authentication is performed.

Each image forming apparatus 10 identifies the network to which it is connected by using a network identifier (referred to as "network ID" hereinafter) as network identification information.

A network ID is information from which the network environment is uniquely identifiable. Any type of information may be used as a network ID so long as the network environment is uniquely identifiable from the information. In this exemplary embodiment, an example where a media access control (MAC) address of a gateway device is used as a network ID will be described. For example, the image forming apparatus 10 identifies that the connected network is the network A by using a MAC address "9C:AE:D3:D7:AE:36" of the gateway device 70A, or identifies that the connected network is the network B by using a MAC address "AC:36:43:CA:AE:25" of the gateway device 70B.

Although only the image forming apparatuses 10 are given reference signs in the information processing system according to this exemplary embodiment shown in FIG. 1, image forming apparatuses other than the image forming apparatuses 10 are also connected within the networks A and B.

In this exemplary embodiment, the image forming apparatuses 10A and 10B each access the access-right management server 60 via the LPWA communication network 50 so as to acquire access-right information of an authenticated user.

A configuration in which such an access-right management server 60 is accessible via the Internet 30 is also possible.

However, in a situation where an image forming apparatus 10 is not connectible to the Internet 30 due to a certain network failure or a situation where the Internet 30 is inaccessible due to improper network settings in the image forming apparatus 10, the functions of the image forming apparatus 10 become completely non-usable.

Furthermore, in recent years, the network in which an image forming apparatus 10 is installed may sometimes be disconnected from the Internet 30 for security reasons, or may be non-connectable with the access-right management server 60 due to a firewall provided therebetween.

Furthermore, when the user performs an authentication process in an image forming apparatus 10, authentication information, such as password information, may sometimes be used in addition to the user ID. If such personal information of the user, such as the user ID and the password information, is exchanged via a network used by unspecified users, such as the Internet 30, there is a possibility of information leakage in mid-course, resulting in a problem in terms of security.

The information processing system according to this exemplary embodiment has the following configuration so that the restriction information corresponding to the user identification information of the user may be acquirable without having to transmit the user identification information via a network used by unspecified users, such as the Internet 30.

Therefore, in the information processing system according to this exemplary embodiment, if a certain user performs an authentication process for using an image forming apparatus 10, the image forming apparatus 10 connects to the access-right management server 60 via an LPWA, which is a low-power wide-area wireless communication line, so as to acquire access-right information of that user.

This LPWA is also called a low-power wide-area network (LPWAN) and is a wireless communication line not capable of performing high-speed communication but capable of exchanging data with low power over a wide area.

Moreover, this LPWA is a wireless communication line connectable to the access-right management server 60 without configuring a network setting, and is based on a wide-area wireless communication network in which data is exchanged at a communication speed lower than the communication speed in the Internet 30 serving as an external network.

In recent years, such LPWA wireless communication lines are provided as commercial services and may be used with communication fees lower than the contract fees for mobile phone networks.

Figure 2:
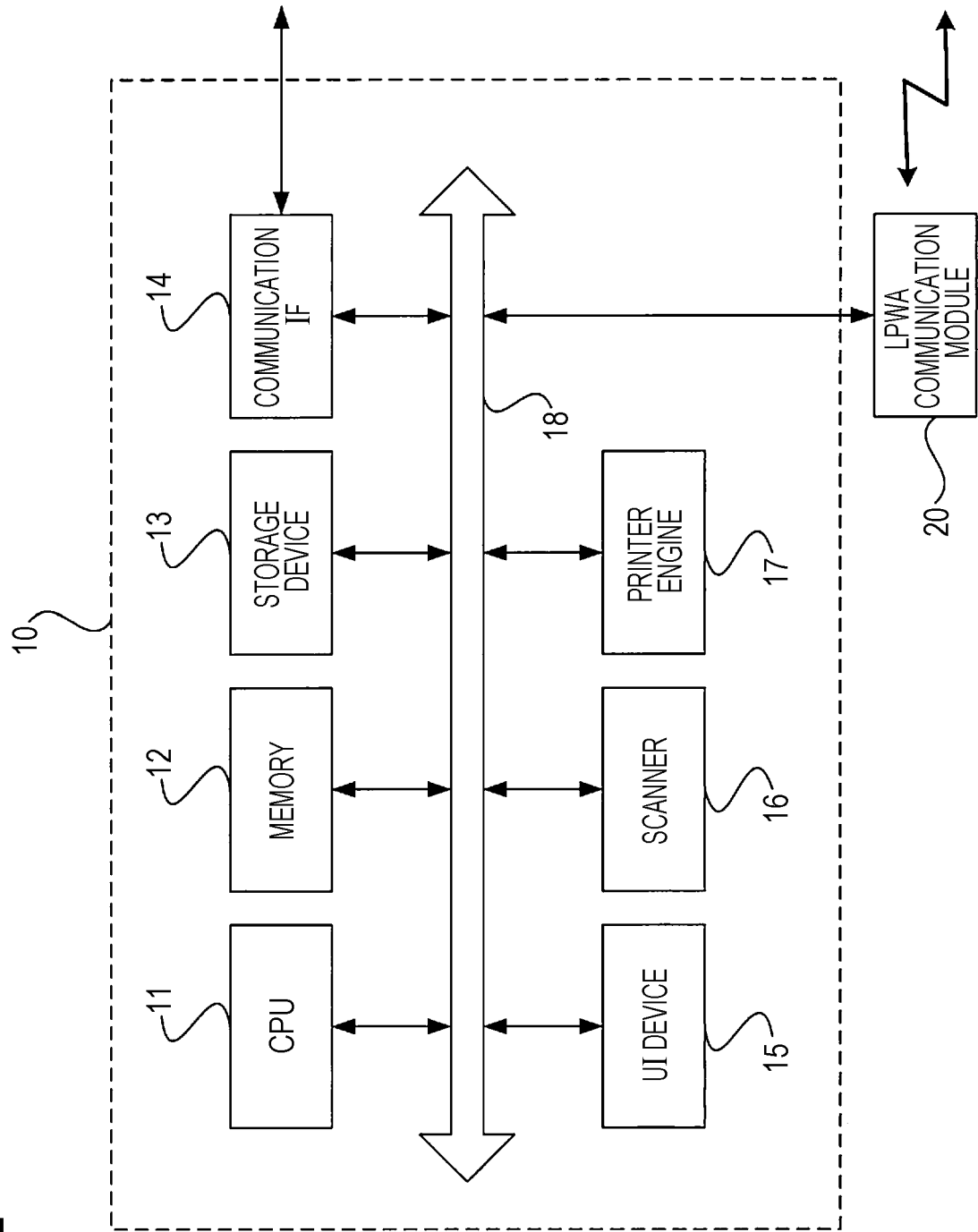
FIG. 2 is a block diagram illustrating a hardware configuration of an image forming apparatus according to the exemplary embodiment of the present disclosure.

FIG. 2 is a block diagram illustrating a hardware configuration of each image forming apparatus 10 shown in FIG. 1.

As shown in FIG. 2, the image forming apparatus 10 has a central processing unit (CPU) 11, a memory 12, a storage device 13, such as a hard disk drive (HDD), a communication interface (IF) 14 that transmits and receives data to and from, for example, another image forming apparatus 10 via the network 30, a user interface (UI) device 15 that includes a touchscreen or a liquid crystal display and a keyboard, a scanner 16, and a printer engine 17. These components are connected to one another via a control bus 18. Furthermore, an LPWA communication module 20 is also connected to the above components via the control bus 18.

The CPU 11 executes a predetermined process based on a control program stored in the memory 12 or the storage device 13, so as to control the operation of the image forming apparatus 10. As an alternative to this exemplary embodiment in which the CPU 11 reads and executes the control program stored in the memory 12 or the storage device 13, the program may be provided to the CPU 11 by being stored in a storage medium, such as a CD-ROM.

Figure 3:
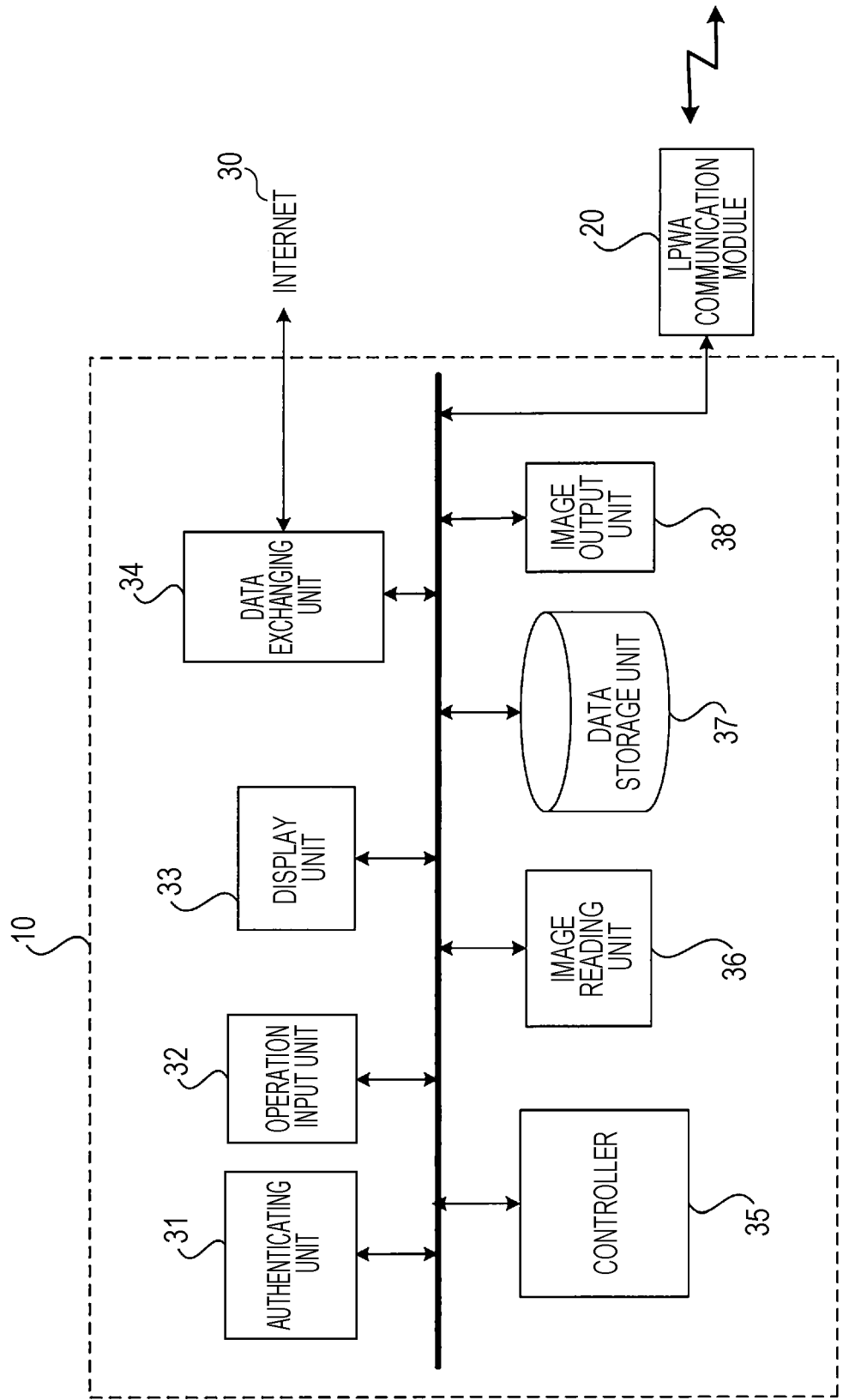
FIG. 3 is a block diagram illustrating a functional configuration of the image forming apparatus according to the exemplary embodiment of the present disclosure.

FIG. 3 is a block diagram illustrating a functional configuration of the image forming apparatus 10 realized by executing the aforementioned control program.

As shown in FIG. 3, the image forming apparatus 10 according to this exemplary embodiment includes an authenticating unit 31, an operation input unit 32, a display unit 33, a data exchanging unit 34, a controller 35, an image reading unit 36, a data storage unit 37, and an image output unit 38.

The authenticating unit 31 authenticates a user trying to use the image forming apparatus 10. In detail, the authentication performed by the authenticating unit 31 involves acquiring authentication information, such as a user ID and password information, from the portable terminal device 80 held by the user and then identifying the user. The user ID is user identification information used for identifying the user using the image forming apparatus 10.

The operation input unit 32 receives various types of operations input by the user. The display unit 33 displays various types of information to the user.

The image reading unit 36 reads an image from a set document based on control performed by the controller 35. The image output unit 38 outputs the image onto a recording medium, such as printing paper, based on control performed by the controller 35.

The data exchanging unit 34 exchanges data with an external apparatus via the Internet 30.

The setting-information storage unit 37 stores setting information used by the controller 35 for performing various types of control, and also temporarily stores acquired access-right information of the user.

The controller 35 controls the image reading unit 36 and the image output unit 38 so as to execute various types of processes, such as a scanning process, a printing process, and a copying process.

The LPWA communication module 20 transmits the user ID of the user authenticated by the authenticating unit 31 to the access-right management server 60 via the LPWA communication network 50.

During normal operation, the image forming apparatuses 10 exchange data with another apparatus via the respective networks A and B, and exchange data with an external apparatus through the Internet 30 via the respective gateway devices 70A and 70B. Specifically, the Internet 30 and the networks A and B are networks normally used by the image forming apparatuses 10.

The LPWA communication network 50 is not a network normally used by the image forming apparatuses 10, and is a dedicated network used for exchanging user IDs and access-right information. In other words, the LPWA communication network 50 is a network used only for exchanging user IDs and access-right information. The information to be exchanged by each image forming apparatus 10 via the LPWA communication network 50 may include only a user ID and access-right information, or may additionally include other information.

The LPWA communication module 20 receives the access-right information of the user corresponding to the transmitted user ID from the access-right management server 60 via the LPWA communication network 50.

Then, the controller 35 controls the range of functions usable by the user based on the access-right information received by the LPWA communication module 20.

The access-right information is information used for restricting a range accessible by an authenticated user. For example, the access-right information is used for specifying a function or functions permitted to be used among the functions of the apparatus. Moreover, the access-right information is restriction-related information used when another apparatus is to be accessed via a network different from the LPWA communication network 50 serving as a dedicated network.

When the authenticating unit 31 performs an authentication process for a user, the controller 35 disables all functions usable by the user until access-right information is received from the access-right management server 60. Alternatively, the controller 35 may disable some of the functions usable by the user, instead of disabling all the functions usable by the user, until access-right information is received from the access-right management server 60.

In detail, when the authenticating unit 31 performs an authentication process for a user, the controller 35 disables some or all functions of the apparatus against the user until access-right information is received from the access-right management server 60.

Furthermore, in detail, when the authenticating unit 31 performs an authentication process for a user, the controller 35 disables some or all interface functions used by the user when another apparatus is to be accessed via a network different from the LPWA communication network 50, until the controller 35 receives access-right information from the access-right management server 60.

Then, if the communication with the authenticated user is interrupted for a predetermined time or longer, such as 30 seconds or longer, or if the distance to the authenticated user reaches a predetermined distance or longer, the controller 35 deletes the access-right information received from the access-right management server 60.

Figure 4:
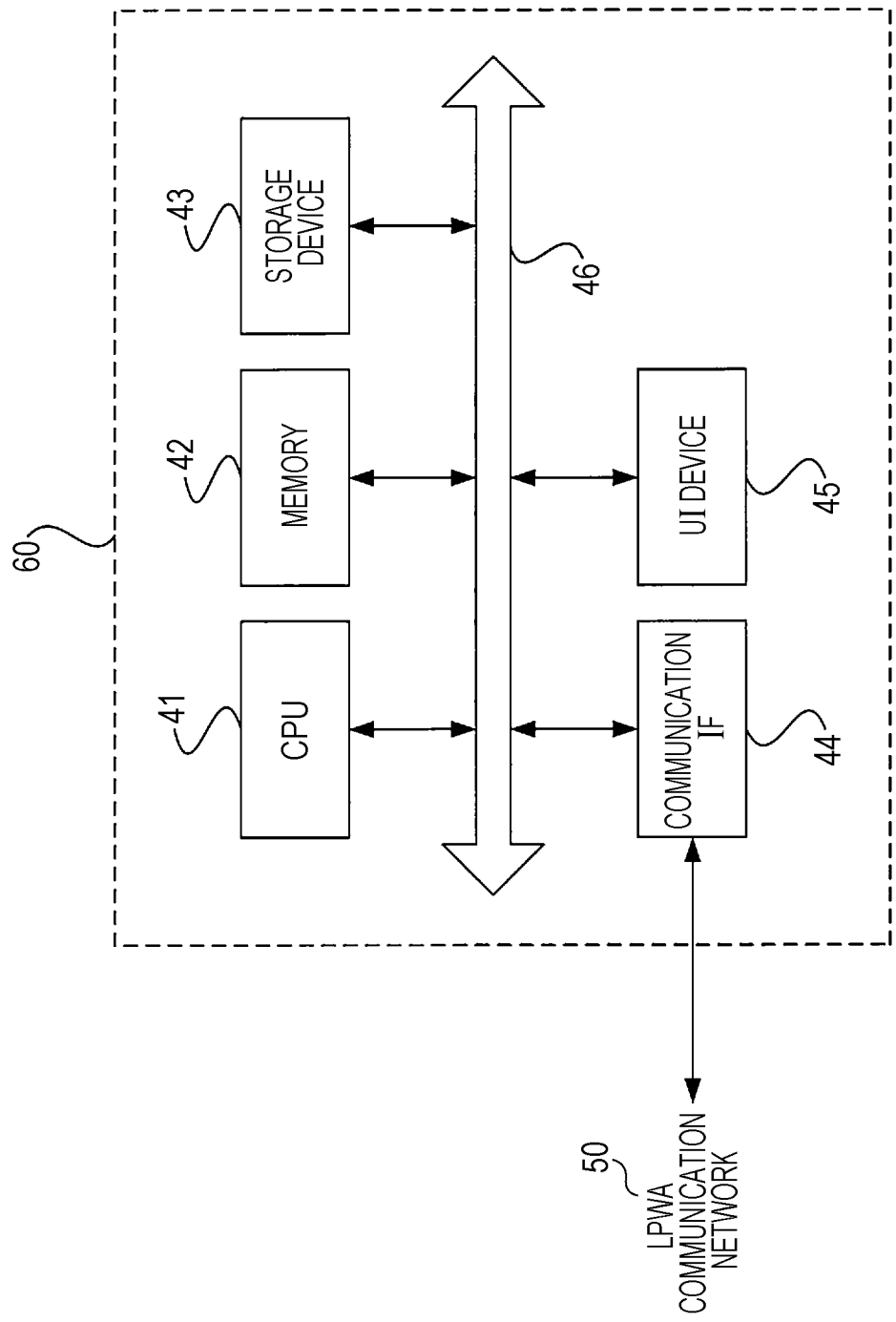
FIG. 4 is a block diagram illustrating a hardware configuration of an access-right management server according to the exemplary embodiment of the present disclosure.

FIG. 4 illustrates a hardware configuration of the access-right management server 60 shown in FIG. 1.

As shown in FIG. 4, the access-right management server 60 has a CPU 41, a memory 42, a storage device 43, such as a hard disk drive (HDD), a communication IF 44 that transmits and receives data to and from, for example, each image forming apparatus 10 via the LPWA communication network 50, and a UI device 45 that includes a touchscreen or a liquid crystal display and a keyboard. These components are connected to one another via a control bus 46.

The CPU 41 executes a predetermined process based on a control program stored in the memory 42 or the storage device 43, so as to control the operation of the access-right management server 60. As an alternative to this exemplary embodiment in which the CPU 41 reads and executes the control program stored in the memory 42 or the storage device 43, the program may be provided to the CPU 41 by being stored in a storage medium, such as a CD-ROM.

Figure 5:
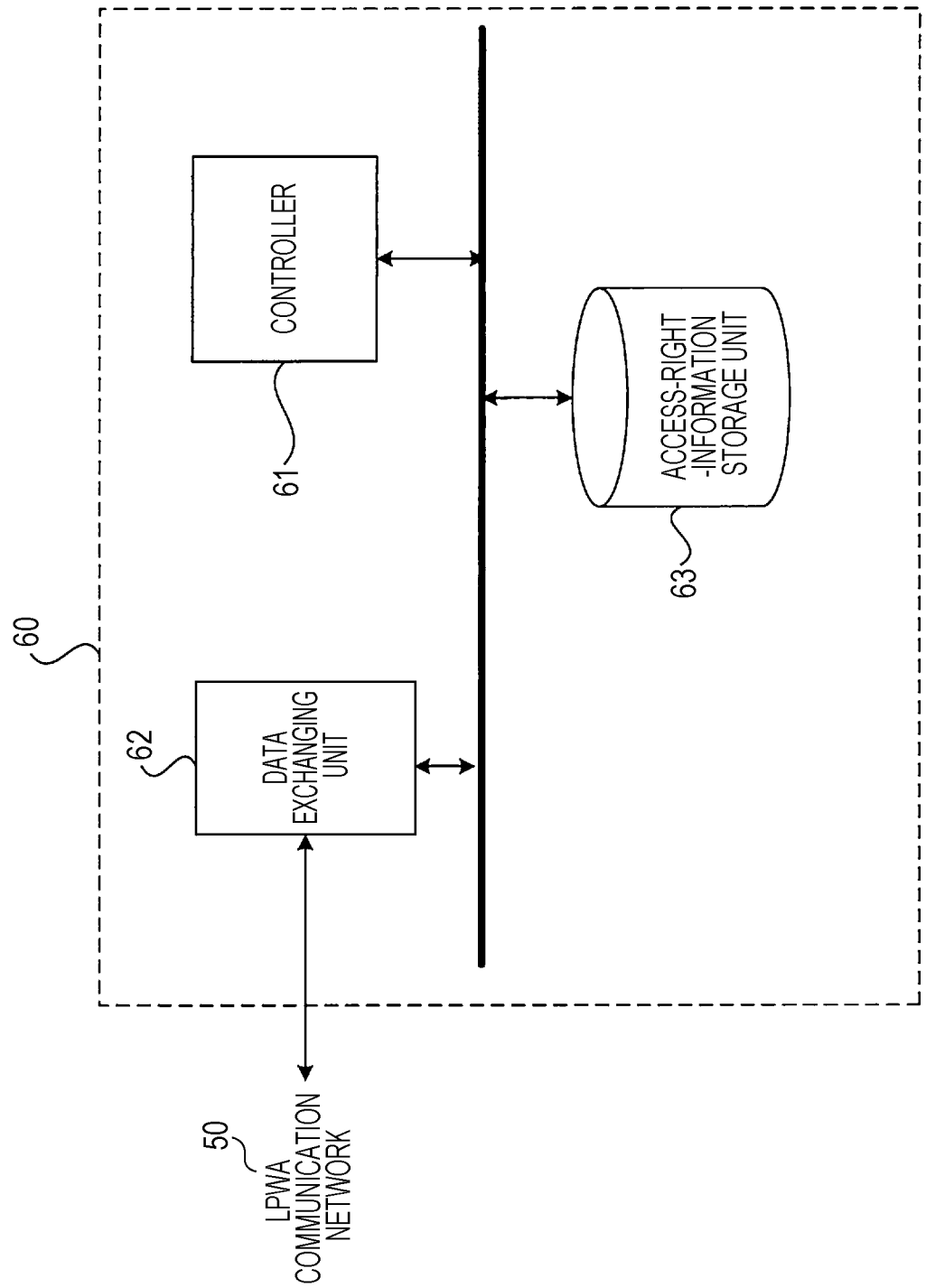
FIG. 5 is a block diagram illustrating a functional configuration of the access-right management server according to the exemplary embodiment of the present disclosure.

FIG. 5 is a block diagram illustrating a functional configuration of the access-right management server 60 realized by executing the aforementioned control program.

As shown in FIG. 5, the access-right management server 60 includes a controller 61, a data exchanging unit 62, and an access-right-information storage unit 63.

The access-right-information storage unit 63 stores an access-right management table in which user IDs of users and access rights are associated with each other.

FIG. 6 illustrates an example of this access-right management table. The types of interfaces with respect to the access-right information managed in the access-right management table shown in FIG. 6 will be described with reference to FIG. 7.

Figure 7:
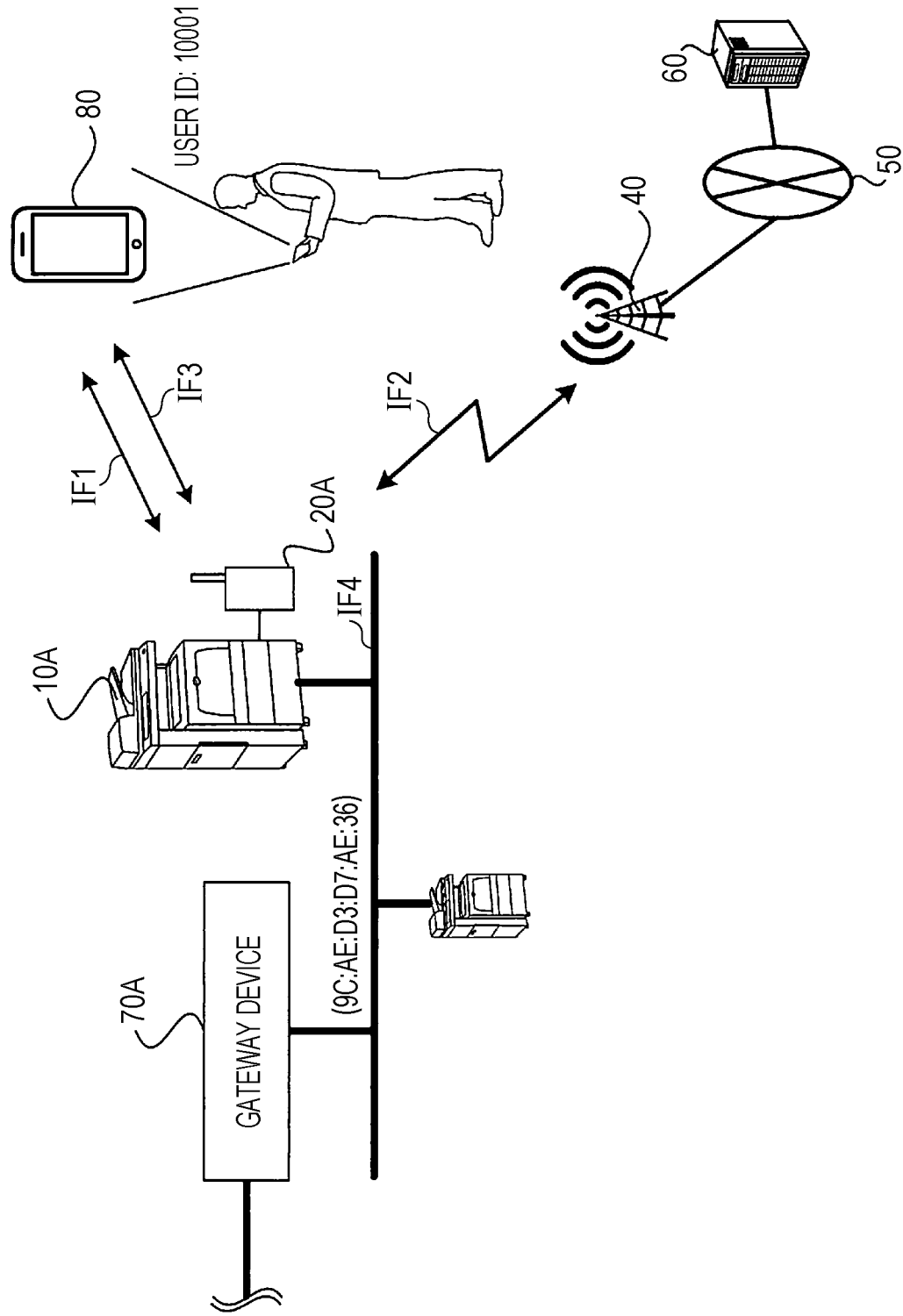
FIG. 7 is a diagram for explaining the types of interfaces with respect to access-right information managed in the access-right management table shown in FIG. 6.

Referring to FIG. 7, it is clear that an interface using a near-field wireless line, such as NFC or BLE, between the portable terminal device 80 held by the user and each image forming apparatus 10 is set as IF1. Moreover, an interface using the LPWA communication network 50 connecting between each image forming apparatus 10 and the access-right management server 60 is set as IF2.

Furthermore, an interface using a WiFi (registered trademark) line between the portable terminal device 80 and each image forming apparatus 10 is set as IF3. Moreover, an interface using Ethernet (registered trademark) to which the image forming apparatus 10A is connected is set as IF4.

The term "local" refers to various functions of the image forming apparatus 10A, such as a copying function and a scanning function, used via an operation panel of the image forming apparatus 10A.

As shown in FIG. 6, in the access-right management table, access-right information is managed for each user ID. The access-right information indicates the range of a function or functions usable by the user and also indicates the permission of exchanging of what type of information via which network, as well as the permission of use of a function or functions.

For example, with regard to a local apparatus, that is, an image forming apparatus 10, a user with a user ID "10001" is permitted to use only a monochrome copying function and a scanning function among various functions of the image forming apparatus 10.

For the user with the user ID "10001", if IF1, that is, the near-field wireless line, is used, only the exchanging of authentication information is permitted. Likewise, if IF2, that is, the LPWA communication network 50, is used, only the exchanging of authentication information is permitted.

Furthermore, for the user with the user ID "10001", if IF3, that is, the WiFi (registered trademark) line with the portable terminal device 80, is used, only monochrome printing and pull scanning functions are permitted. It is also indicated that access to other apparatuses via IF4, that is, the network A, is prohibited. A pull scanning function is a scanning function where an image forming apparatus 10 is commanded to execute a scanning process in response to a command from the portable terminal device 80.

When the data exchanging unit 62 receives a user ID from an image forming apparatus 10 via the LPWA communication network 50, the controller 61 reads access-right information corresponding to the received user ID from the access-right-information storage unit 63 and transmits the access-right information to the image forming apparatus 10, from which the user ID is transmitted, via the LPWA communication network 50.

Next, the operation of each image forming apparatus 10 according to this exemplary embodiment will be described in detail with reference to the drawings.

Figure 8:
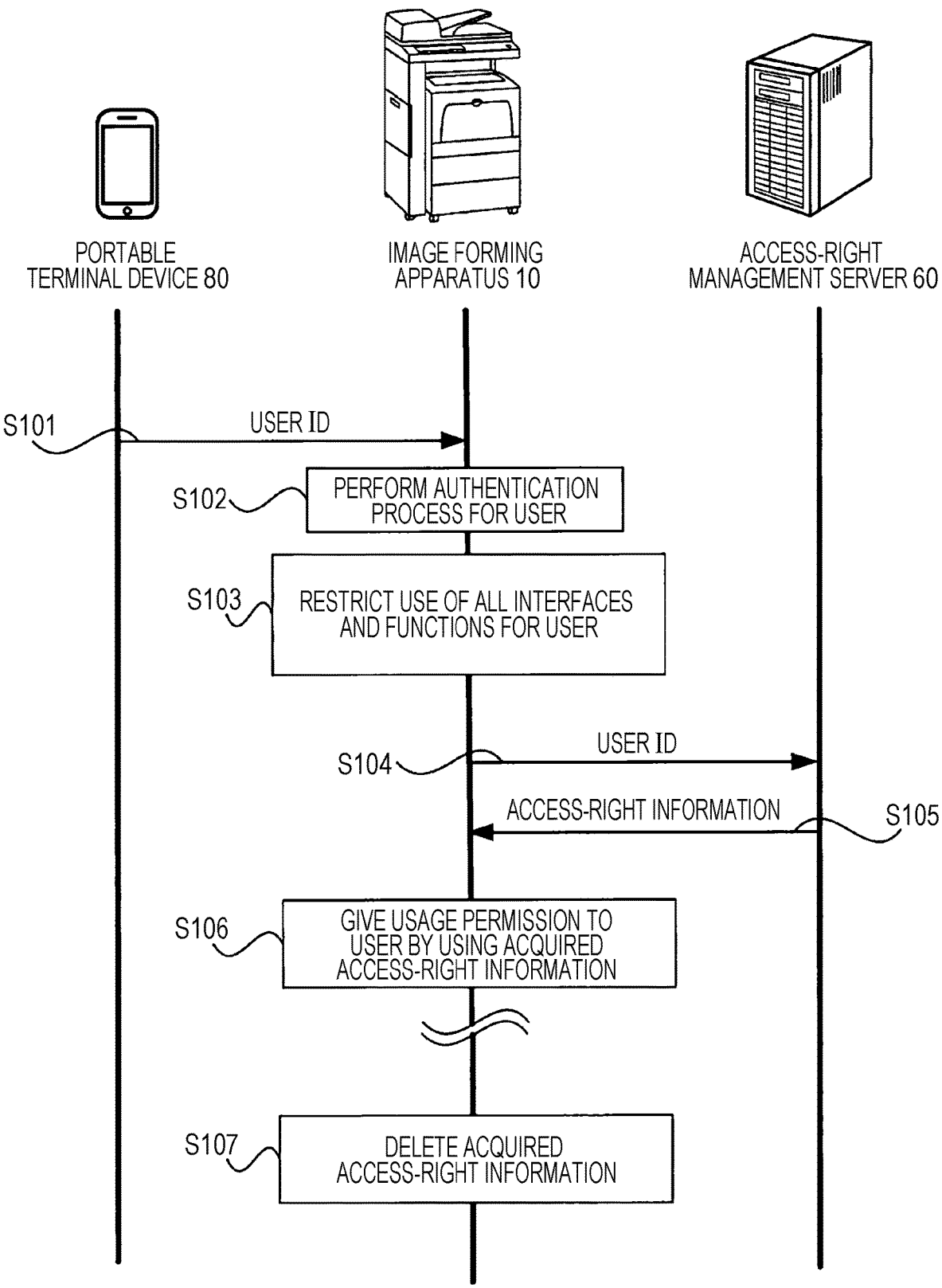
FIG. 8 is a sequence chart illustrating how data is exchanged among a portable terminal device, the image forming apparatus, and the access-right management server.

The following description with reference to a sequence chart in FIG. 8 relates to how data is exchanged between the image forming apparatus 10 and the access-right management server 60 when the user holding the portable terminal device 80 performs an authentication process in the image forming apparatus 10.

First, in step S101, the user transmits the user ID to the image forming apparatus 10 from the portable terminal device 80 via the near-field wireless line, so that an authentication process is performed.

In step S102, the image forming apparatus 10 executes the authentication process for the user based on the received user ID.

When the authentication process is completed, the image forming apparatus 10 restricts the use of all interfaces and functions for the user in step S103.

Then, in step S104, the image forming apparatus 10 transmits the user ID to the access-right management server 60. In step S105, the access-right management server 60 reads access-right information corresponding to the received user ID from the access-right management table and transmits the access-right information as a reply to the image forming apparatus 10.

In step S106, the image forming apparatus 10 having received the access-right information gives usage permission to the user by using the acquired access-right information.

Subsequently, when communication with the portable terminal device 80 held by the user is not possible for a predetermined period or longer as a result of the user moving away from the image forming apparatus 10, the image forming apparatus 10 deletes the acquired access-right information in step S107.

In the example of the access-right management table shown in FIG. 6, different access-right information is stored in correspondence with each user ID.

Alternatively, access-right information may be varied for each combination of a user ID and a network ID. FIG. 9 illustrates an example of such an access-right management table.

FIG. 9 illustrates an example of an access-right management table in which different access-right information is stored in correspondence with each combination of a user ID and a network ID.

Specifically, the contents of access-right information vary even for the same user ID if the network ID is different.

In detail, referring to the access-right management table in FIG. 9, in the case of the user ID "10001", "monochrome copying" and "scanning" functions are permitted as local functions when the network ID is "9C:AE:D3:D7:AE:36", whereas "color copying" and "scanning" functions are permitted as local functions when the network ID is "AC:36:43:CA:AE:25".

Specifically, in the information processing system having the configuration shown in FIG. 1, when the user with the user ID "10001" is authenticated and is to use the image forming apparatus 10A connected to the network A, the "monochrome copying" and "scanning" functions are usable. In contrast, when this user is authenticated and is to use the image forming apparatus 10B connected to the network B, the "color copying" and "scanning" functions are usable.

By setting access-right information for each combination of a user ID and a network ID in this manner, the functions permitted to and the interfaces usable by the same user may be varied for each network to which the image forming apparatuses 10 are connected.

In the case of such access-right information, the LPWA communication module 20 of each image forming apparatus 10 transmits, to the access-right management server 60, the user ID of the user authenticated by the authenticating unit 31 and the network ID of the network to which the image forming apparatus 10 is connected. Then, the LPWA communication module 20 of the image forming apparatus 10 receives, from the access-right management server 60, access-right information of the user corresponding to the transmitted user ID and the transmitted network ID.

Alternatively, different access-right information may be stored in correspondence with each combination of a user ID and an apparatus ID. FIG. 10 illustrates an example of such an access-right management table.

The following description relates to a case where the image forming apparatus 10A has an apparatus ID "99901" and the image forming apparatus 10B has an apparatus ID "99902".

FIG. 10 illustrates an example of an access-right management table in which different access-right information is stored in correspondence with each combination of a user ID and an apparatus ID.

Specifically, the contents of access-right information vary even for the same user ID if the apparatus ID is different.

In detail, referring to the access-right management table in FIG. 10, in the case of the user ID "10001", "monochrome copying" and "scanning" functions are permitted as local functions when the apparatus ID is "99901", whereas "color copying" and "scanning" functions are permitted as local functions when the apparatus ID is "99902".

Specifically, in the information processing system having the configuration shown in FIG. 1, when the user with the user ID "10001" is authenticated and is to use the image forming apparatus 10A, the "monochrome copying" and "scanning" functions are usable. In contrast, when this user is authenticated and is to use the image forming apparatus 10B, the "color copying" and "scanning" functions are usable.

By setting access-right information for each combination of a user ID and an apparatus ID in this manner, the functions permitted to and the interfaces usable by the same user may be varied for each image forming apparatus 10 to be used.

In the case of such access-right information, the LPWA communication module 20 of each image forming apparatus 10 transmits, to the access-right management server 60, the user ID of the user authenticated by the authenticating unit 31 and the apparatus ID of the image forming apparatus 10. Then, the LPWA communication module 20 of the image forming apparatus 10 receives, from the access-right management server 60, access-right information of the user corresponding to the transmitted user ID and the transmitted apparatus ID.

Finally, the following description with reference to a sequence chart in FIG. 11 relates to how data is exchanged among the portable terminal device 80, the image forming apparatus 10, and the access-right management server 60 when access-right information varies for each network ID or each apparatus ID.

Since the sequence chart in FIG. 11 is different from the sequence chart shown in FIG. 8 only in that step S104 is replaced with step S104A, only the different process will be described below.

When the authentication process for the user holding the portable terminal device 80 is completed and the use of all interfaces and functions is restricted for the user, the image forming apparatus 10 transmits a user ID and a network ID or a user ID and an apparatus ID to the access-right management server 60 in step S104A. Then, in step S105, the access-right management server 60 reads access-right information corresponding to the received user ID and network ID or the received user ID and apparatus ID from the access-right management table and transmits the access-right information as a reply to the image forming apparatus 10.

The process after the image forming apparatus 10 receives the access-right information from the access-right management server 60 is the same as that in the sequence chart shown in FIG. 8.

Modifications

The description of the above exemplary embodiment relates to a case where access-right information in an image forming apparatus 10 is acquired from the access-right management server 60. Alternatively, the present disclosure is similarly applicable to a case where access-right information in another information processing apparatus other than an image forming apparatus is acquired from the access-right management server 60.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a hardware processor programmed to:
      authenticate a user;
      transmit user identification information of the user authenticated by the processor to a management apparatus via a dedicated network used for exchanging the user identification information and restriction information;
      receive the restriction information of the user corresponding to the transmitted user identification information from the management apparatus via the dedicated network; and
      control a range of a function usable by the user based on the restriction information received by the processor, wherein
   the dedicated network is connected only to the information processing apparatus and the management apparatus,
   the dedicated network is a wireless communication line connectable to the management apparatus without a network setting, and
   the wireless communication line is based on a wide-area wireless communication network in which data is exchanged at a communication speed lower than a communication speed in a network different from the dedicated network.

2. The information processing apparatus according to claim 1,
   wherein the restriction information is access-right information used for restricting a range accessible by the authenticated user.

3. The information processing apparatus according to claim 2,
   wherein the access-right information is information used for specifying a function permitted to be used among functions of the information processing apparatus.

4. The information processing apparatus according to claim 3,
   wherein when the user is authenticated by the processor, the processor disables at least one or all of functions usable by the user until the restriction information is received from the management apparatus.

5. The information processing apparatus according to claim 4,
   wherein when the user is authenticated by the processor, the processor disables at least one or all of functions of the information processing apparatus against the user until the restriction information is received from the management apparatus.

6. The information processing apparatus according to claim 2,
wherein the access-right information is restriction-related information used when another apparatus is to be accessed via the network different from the dedicated network.

7. The information processing apparatus according to claim 6,
wherein when the user is authenticated by the processor, the processor disables at least one or all of functions usable by the user until the restriction information is received from the management apparatus.

8. The information processing apparatus according to claim 7,
wherein when the user is authenticated by the processor, the processor disables at least one or all of functions of the information processing apparatus against the user until the restriction information is received from the management apparatus.

9. The information processing apparatus according to claim 2,
wherein when the user is authenticated by the processor, the processor disables at least one or all of functions usable by the user until the restriction information is received from the management apparatus.

10. The information processing apparatus according to claim 9,
wherein when the user is authenticated by the processor, the processor disables at least one or all of functions of the information processing apparatus against the user until the restriction information is received from the management apparatus.

11. The information processing apparatus according to claim 1,
wherein when the user is authenticated by the processor, the processor disables at least one or all of functions usable by the user until the restriction information is received from the management apparatus.

12. The information processing apparatus according to claim 11,
wherein when the user is authenticated by the processor, the processor disables at least one or all of functions of the information processing apparatus against the user until the restriction information is received from the management apparatus.

13. The information processing apparatus according to claim 11,
wherein when the user is authenticated by the processor, the processor disables at least one or all of functions against the user until the restriction information is received from the management apparatus, the functions being used when another apparatus is to be accessed via the network different from the dedicated network.

14. The information processing apparatus according to claim 1,
wherein the processor transmits apparatus identification information of the information processing apparatus to the management apparatus together with the user identification information of the user authenticated by the processor, and
wherein the processor receives, from the management apparatus, the restriction information of the user corresponding to the transmitted user identification information and the transmitted apparatus identification information.

15. The information processing apparatus according to claim 1,
wherein the processor transmits, to the management apparatus, network identification information of the network different from the dedicated network together with the user identification information of the user authenticated by the processor it, and
wherein the processor receives, from the management apparatus, the restriction information of the user corresponding to the transmitted user identification information and the transmitted network identification information.

16. The information processing apparatus according to claim 1,
wherein, in a case where communication with the authenticated user is interrupted for a predetermined time or longer or a distance to the authenticated user reaches a predetermined distance or longer, the processor deletes the restriction information received from the management apparatus.

17. An information processing system comprising:
a management apparatus that stores user identification information of a user and restriction information in correspondence with each other, the restriction information restricting a range of a function usable by the user; and
an information processing apparatus including a hardware processor programmed to:
authenticate the user,
transmit the user identification information of the user authenticated by the processor to the management apparatus via a dedicated network used for exchanging the user identification information and the restriction information,
receive the restriction information of the user corresponding to the transmitted user identification information from the management apparatus via the dedicated network, and
control the range of the function usable by the user based on the restriction information received by the processor, wherein
the dedicated network is connected only to the information processing apparatus and the management apparatus,
the dedicated network is a wireless communication line connectable to the management apparatus without a network setting, and
the wireless communication line is based on a wide-area wireless communication network in which data is exchanged at a communication speed lower than a communication speed in a network different from the dedicated network.

18. A non-transitory computer readable medium storing a program causing a computer to execute a process, the process comprising:
authenticating a user;
transmitting user identification information of the authenticated user to a management apparatus via a dedicated network used for exchanging the user identification information and restriction information;
receiving the restriction information of the user corresponding to the transmitted user identification information from the management apparatus via the dedicated network; and
controlling a range of a function usable by the user based on the received restriction information, wherein
the dedicated network is connected only to the computer and the management apparatus, the dedicated network is a wireless communication line connectable to the management apparatus without a network setting, and the wireless communication line is based on a wide-area wireless communication network in which data is exchanged at a communication speed lower than a communication speed in a network different from the dedicated network.

* * * * *